(12) United States Patent
Sheaffer

(10) Patent No.: US 8,359,433 B2
(45) Date of Patent: Jan. 22, 2013

(54) METHOD AND SYSTEM OF HANDLING NON-ALIGNED MEMORY ACCESSES

(75) Inventor: Gad S. Sheaffer, Haifa (IL)

(73) Assignee: Intel Corporation, Santa Clara, CA (US)

( * ) Notice: Subject to any disclaimer, the term of this patent is extended or adjusted under 35 U.S.C. 154(b) by 218 days.

(21) Appl. No.: 12/857,933

(22) Filed: Aug. 17, 2010

(65) Prior Publication Data

US 2012/0047311 A1 Feb. 23, 2012

(51) Int. Cl.
*G06F 13/00* (2006.01)
*G06F 13/28* (2006.01)

(52) U.S. Cl. ............ 711/127; 711/E12.015; 710/52
(58) Field of Classification Search .......... 711/127, 711/E12.015; 710/52
See application file for complete search history.

(56) References Cited

U.S. PATENT DOCUMENTS

| | | |
|---|---|---|
| 5,577,200 A | 11/1996 | Abramson et al. |
| 5,802,556 A | 9/1998 | Patel et al. |
| 6,721,866 B2 | 4/2004 | Roussel et al. |
| 2003/0131030 A1 | 7/2003 | Sebot et al. |
| 2004/0260878 A1* | 12/2004 | Zhang ............ 711/118 |
| 2007/0106883 A1* | 5/2007 | Choquette ......... 712/225 |

FOREIGN PATENT DOCUMENTS

WO WO-2012024053 2/2012

OTHER PUBLICATIONS

Intel 64 and IA-32 Architectures Software Developer's Manual, Mar. 2010, 832 pages, vol. 2B: Instruction Set Reference, N-Z, Intel Corporation.
International Search Report and Written Opinion for PCT Patent Application No. PCT/US2011/044977 Mailed Apr. 6, 2012, 10 Pages.

* cited by examiner

*Primary Examiner* — Edward Dudek, Jr.
(74) *Attorney, Agent, or Firm* — Blakely, Sokoloff, Taylor & Zafman LLP

(57) ABSTRACT

A method and system to facilitate full throughput operation of cache memory line split accesses in a device. By facilitating full throughput operation of cache memory line split accesses in the device, the device minimizes the performance and throughput loss associated with the handling of non-aligned cache memory accesses that cross two or more cache memory lines and/or page memory boundaries in one embodiment of the invention. When the device receives a non-aligned cache memory access request, the merge logic combines or merges the incoming data of a particular cache memory line from a data cache memory with the stored data of the preceding cache memory line of the particular cache memory line.

18 Claims, 6 Drawing Sheets

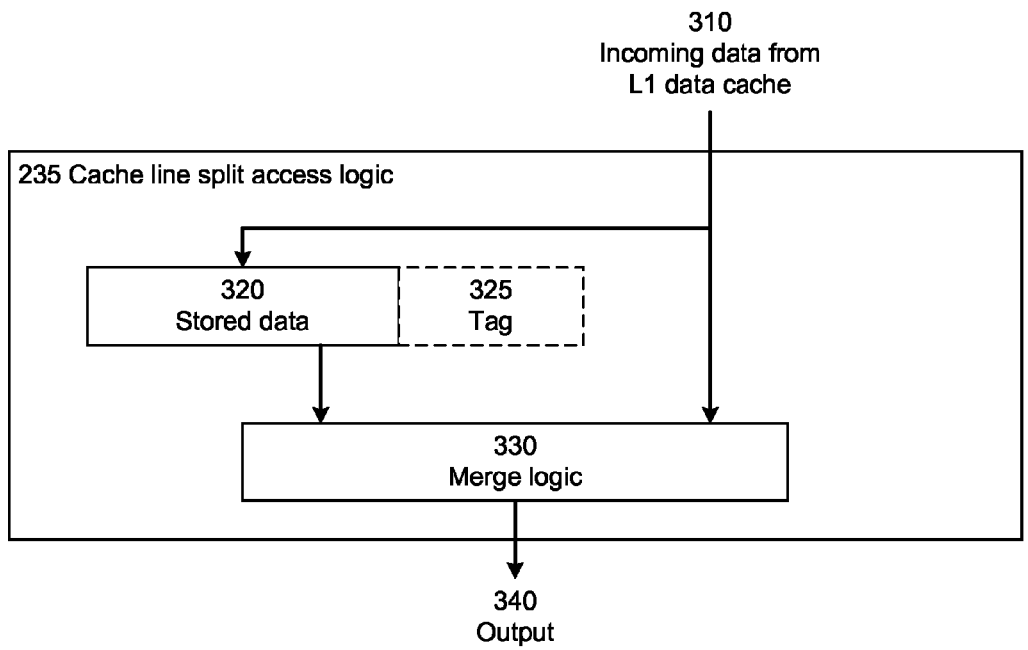
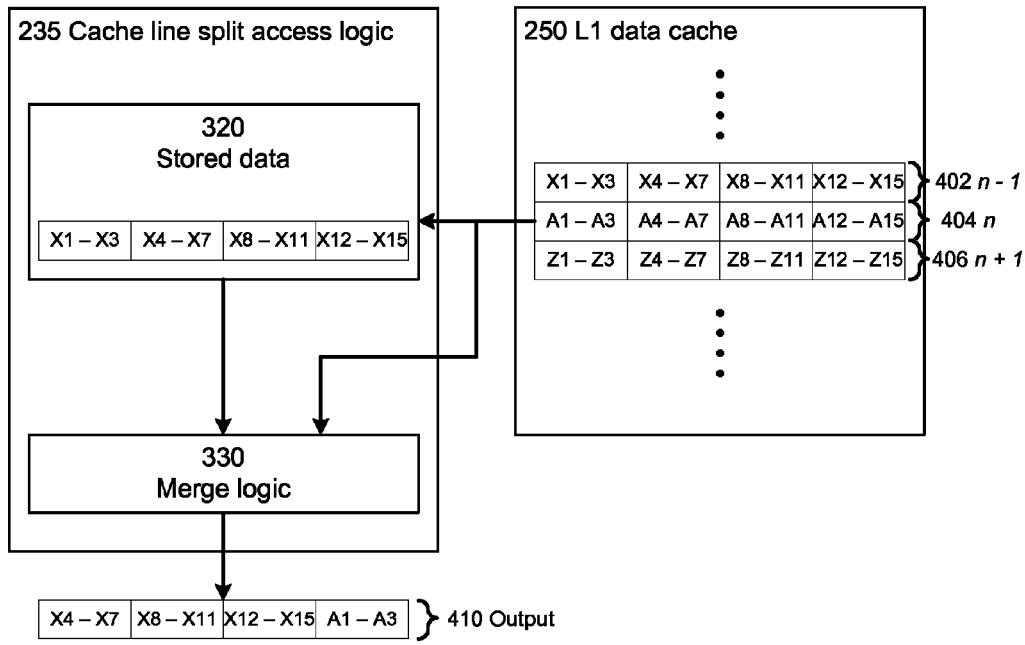

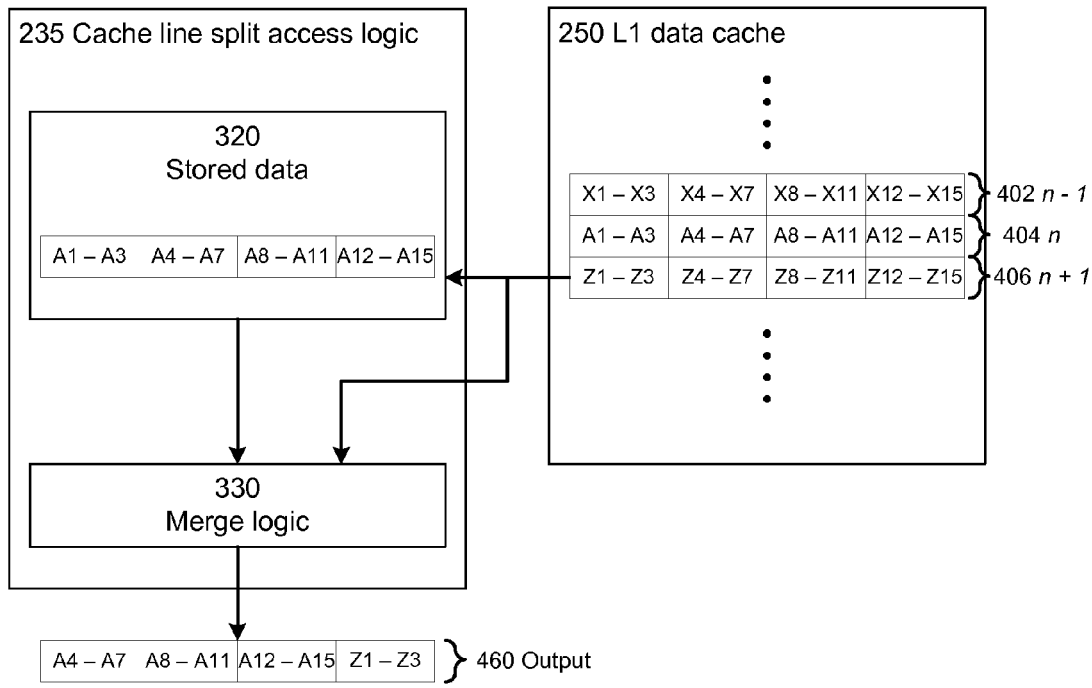
450   FIG. 4B
510 Load instruction:   LOADX SOURCE, DESTINATION, INDEX
500   FIG. 5

METHOD AND SYSTEM OF HANDLING NON-ALIGNED MEMORY ACCESSES

FIELD OF THE INVENTION

This invention relates to memory accesses in a processor, and more specifically but not exclusively, to a method and system to handle non-aligned memory accesses in the processor.

BACKGROUND DESCRIPTION

A cache memory allows a processor to execute instructions faster by storing the most recently used copies of the main memory in the cache lines of the cache memory. The access latency of a program can be reduced if its required instructions or data are stored in the cache lines of the cache memory.

In some instances, the access or read operation of the cache memory may not be aligned to the width of the cache memory line, i.e., non-aligned cache memory access. FIG. 1 illustrates a block diagram 100 of prior art non-aligned cache memory accesses. The 64-byte cache memory line n 110 has a width of 64 bytes and stores data A1 to A16. The 64-byte cache memory lines n−1 105 and n+1 115 illustrate the cache memory line preceding and succeeding the 64-byte cache memory line n 110 respectively.

An aligned cache memory access 120 of the 64-byte cache memory line n 110 occurs when the access does not cross over to any other cache memory lines. A cache memory line split access of 4 bytes 130 occurs when the access is shifted 4 bytes from the aligned cache memory access 120, i.e., the required data is the data A2 to A16 from the 64-byte cache memory line n 110 and the data Z1 from the 64-byte cache memory line n+1 115. The cache memory line split access of 8 bytes 140 and the cache memory line split access of 12 bytes 150 illustrate two other examples of non-aligned cache memory accesses.

BRIEF DESCRIPTION OF THE DRAWINGS

The features and advantages of embodiments of the invention will become apparent from the following detailed description of the subject matter in which:

FIG. 3 illustrates a block diagram of a cache memory line split access logic in accordance with one embodiment of the invention;

FIG. 4A illustrates the operation of the cache memory line split access logic in accordance with one embodiment of the invention;

FIG. 4B illustrates the operation of the cache memory line split access logic in accordance with one embodiment of the invention;

FIG. 5 illustrates a format of an instruction in accordance with one embodiment of the invention;

DETAILED DESCRIPTION

Figure 1:
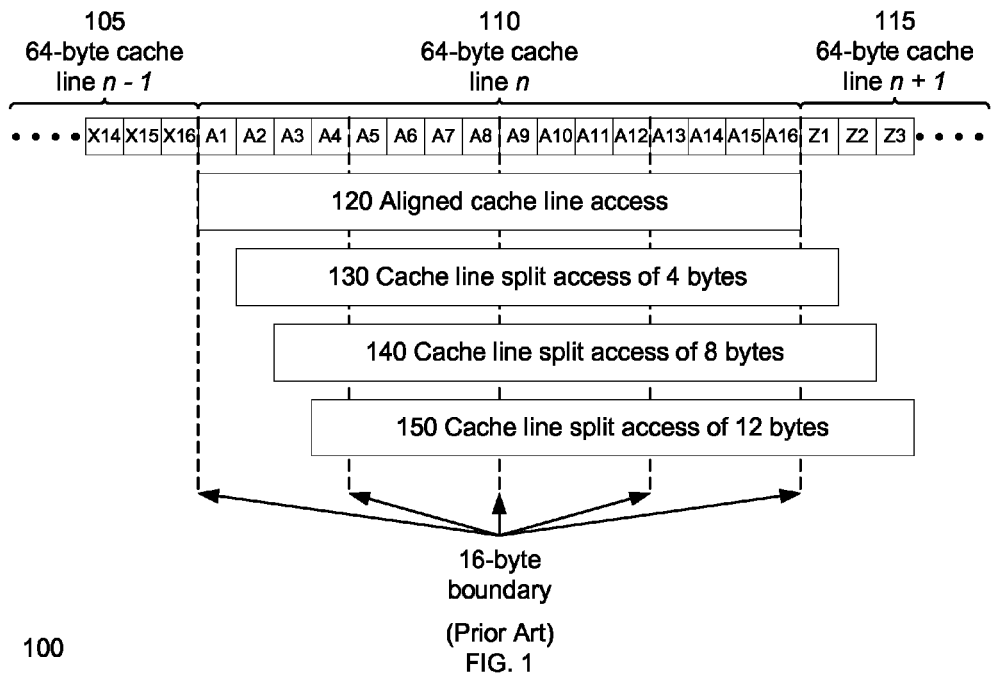
FIG. 1 illustrates a block diagram of prior art non-aligned cache memory accesses.

Embodiments of the invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements. Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment.

A non-aligned or misaligned memory access of a cache memory refers to, but is not limited to, a memory access that crosses two or more cache memory lines, a memory access that crosses the boundary of a page memory, and the like. A non-aligned memory access is referred to as a cache memory line split access in one embodiment of the invention.

Embodiments of the invention provide a method and system to handle non-aligned memory accesses. In one embodiment of the invention, the non-aligned memory accesses are performed on a cache memory in a device. The device has logic to facilitate full throughput operation of cache memory line split accesses in the device in one embodiment of the invention. The device includes, but is not limited to, a controller, a processor, a processing core or unit, and the like.

By facilitating full throughput operation of cache memory line split accesses in the device, the device minimizes the performance and throughput loss associated with the handling of non-aligned cache memory accesses that cross two or more cache memory lines and/or page memory boundaries in one embodiment of the invention.

Figure 2:
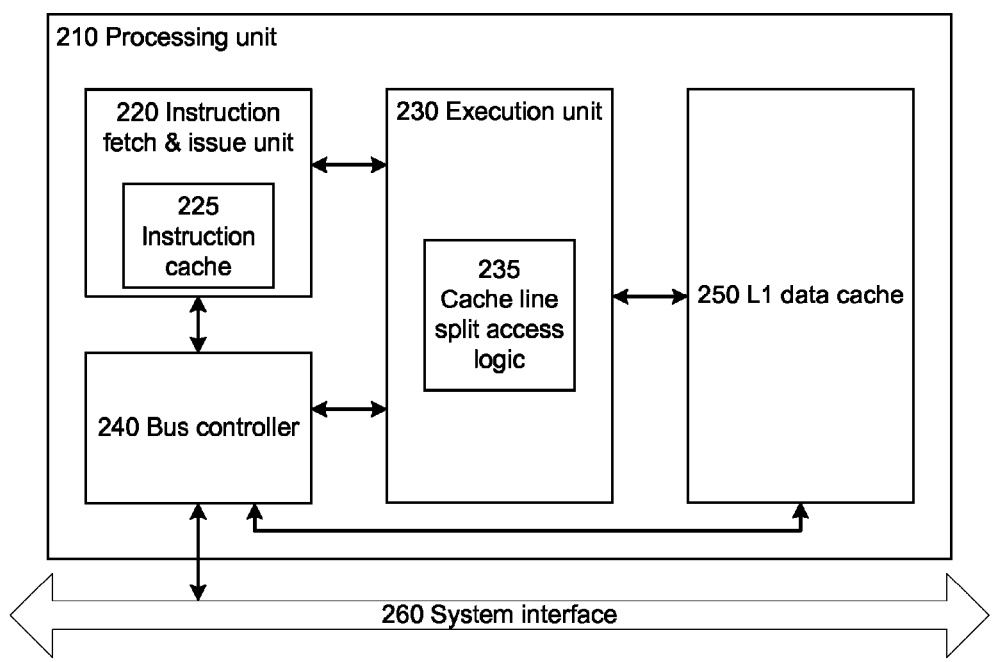
FIG. 2 illustrates a block diagram of a processing unit in accordance with one embodiment of the invention.

FIG. 2 illustrates a block diagram 200 of a processing unit 210 in accordance with one embodiment of the invention. The processing unit 210 has an instruction fetch and issue unit 220, a bus controller 240, an execution unit 230 and a level one (L1) data cache memory 250 in one embodiment of the invention.

The bus controller 240 of the processing unit 210 is coupled with a system interface 260 to connect to other components including, but not limited to, a main memory, a level two and/or higher levels of cache memory, a chipset and the like. The instruction fetch and issue unit 220 fetches instructions through the bus controller 240 via the system interface 260, or any other external interface. The fetched instructions are stored in the instruction cache memory 225. In one embodiment of the invention, the bus controller 240 manages cache coherency transfers in the processing unit 210.

The execution unit 230 receives and executes the fetched instructions from the instruction fetch and issue unit 220 and performs arithmetic and logic operations, including but not limited to, add, subtract, logical AND, integer multiply, memory operations and the like. In one embodiment of the invention, the execution unit 230 has a cache memory line split access logic 235 to facilitate full throughput operation of cache memory line split accesses of the L1 data cache memory 250. In one embodiment of the invention, the cache memory line split access logic 235 determines whether a memory access instruction requires non-aligned access of the L1 data cache memory 250. The cache memory line split access logic 235 handles the memory access instruction if the instruction requires misaligned access of the L1 data cache memory 250. In one embodiment of the invention, the L1 data cache memory 250 has other components such as a translation look-aside buffer (TLB) that is not shown in FIG. 2 for clarity of illustration.

The illustration of the processing unit 210 is not meant to be limiting and different configurations of the processing unit 210 can be used without affecting the workings of the invention. For example, in one embodiment of the invention, the L1 data cache memory 250 is integrated with the execution unit 230. The cache memory line split access logic 235 is not limited to facilitate full throughput operation of cache memory line split accesses of the L1 data cache memory 250, and can facilitate full throughput operation of cache memory line split accesses of higher levels of cache memories and/or external memory.

FIG. 3 illustrates a block diagram 300 of a cache memory line split access logic 235 in accordance with one embodiment of the invention. In one embodiment of the invention, the cache memory line split access logic 235 has a data structure and merge logic 330. The data structure has a stored data array 320 and a tag array 325 in one embodiment of the invention. The tag array 325 is an optional feature in some embodiments of the invention.

The stored data array 320 holds or stores one or more cache memory lines of the L1 data cache memory 250 that are previously accessed through a misaligned access of the L1 data cache memory 250. The tag array 325 holds or stores the respective addresses of the cache memory lines that are stored in the stored data array 320. In one embodiment of the invention, the respective addresses stored in the tag array 325 are the addresses of the cache memory lines that are stored in the stored data array 320.

When the cache memory line split access logic 235 receives a non-aligned cache memory access request, the merge logic 330 combines or merges the incoming data of a particular cache memory line 310 from the L1 data cache memory 250 with the stored data of the preceding cache memory line of the particular cache memory line in the stored data array 320. The output 340 of the combination by the merge logic 330 fulfills the non-aligned cache memory access request.

For example, in one embodiment of the invention, when the cache memory line split access logic 235 receives a misaligned cache memory line split access request of cache memory lines n and n+1, the merge logic 330 combines or merges the incoming data of the cache memory line n+1 from the L1 data cache memory 250 with the stored data of the cache memory line n in the stored data array 320. The merged logic 330 combines the two sources of data and sends the combined data as the output 340 to fulfill the misaligned cache memory line split access request of cache memory lines n and n+1.

The cache memory line split access logic 235 requires a single machine or clock cycle to fulfill the misaligned cache memory access request in one embodiment of the invention. By doing so, the processing unit 210 avoids wasting half the bandwidth of the L1 data cache memory 250 and minimizes the number of registers to fulfill a misaligned cache memory request in one embodiment of the invention.

The structure of the cache memory line split access logic 235 is not meant to be limiting and different configurations of the structure of the cache memory line split access logic 235 can be used without affecting the workings of the invention. The data structure is implemented using, but not limited to, registers, flip-flips, buffers, and other structures capable of storing information.

FIG. 4A illustrates the operation 400 of the cache memory line split access logic 235 in accordance with one embodiment of the invention. For clarity of illustration, the L1 data cache memory 250 is assumed to have a plurality of cache memory lines that include the cache memory lines n−1 402, n 404 and n+1 406. Each cache memory line of the L1 data cache memory 250 is assumed to have a data width of 64 bytes (as an example).

The cache memory line split access logic 235 is assumed to receive an instruction or request that requires 48 bytes of data from the cache memory line n−1 402 and 16 bytes of data from the cache memory line n 404. The stored data array 320 is assumed to store the data of the cache memory line n−1 402 during a prior misaligned cache memory access.

When the cache memory line split access logic 235 executes the instruction with the misaligned cache memory line split access of 16 bytes, the merge logic 330 reads the data from the cache memory line n 404 within a particular machine or clock cycle. The merge logic 330 reads the stored data of cache memory line n−1 402 during the particular machine cycle and merges the data from the cache memory line n−1 402 and the cache memory line n 404 to form the output 410. The output 410 is formed by combining the last 48 bytes of the data in the cache memory line n−1 402, i.e., data X4 to X15, with the first 16 bytes of the data in the cache memory line n 404, i.e., A1 to A3.

After the merge logic 330 receives the stored data of the cache memory line n−1 402, the cache memory line split access logic 235 replaces the stored data of the cache memory line n−1 402 in the stored data array 320 with the data of the cache memory line n 404 in one embodiment of the invention. This facilitates contiguous cache memory line split accesses to achieve full throughput operation within a single machine or clock cycle.

The illustration of FIG. 4A is not meant to be limiting and other configuration of the L1 data cache memory 250 and cache memory line split access logic 235 can be used without affecting the workings of the invention. For example, in another embodiment of the invention, the L1 data cache memory 250 has a cache line width more or less than 64 bytes. In a processing unit 210 with more than one execution thread, the cache memory line split access logic 235 is implemented for each execution thread in one embodiment of the invention. The stored data array 330 may also store more than one cache memory line in one embodiment of the invention.

FIG. 4B illustrates the operation 450 of the cache memory line split access logic 235 in accordance with one embodiment of the invention. For clarity of illustration, the operation 450 of the cache memory line split access logic 235 illustrates an operation performed after the operation 400 of the cache memory line split access logic 235. The cache memory line split access logic 235 is assumed to receive an instruction or request with a misaligned cache memory line split access of 16 bytes, i.e., the instruction requires 48 bytes of data from the cache memory line n 404 and 16 bytes of data from the cache memory line n+1 406.

The data of the cache memory line n 404 is stored in the stored data array 320 during the operation 400 of the cache memory line split access logic 235. When the cache memory line split access logic 235 executes the instruction with the misaligned cache memory line split access of 16 bytes, the merge logic 330 reads the data from the cache memory line n+1 406 within a particular machine or clock cycle. The merge logic 330 reads the stored data of cache memory line n 404 during the particular machine cycle and merges the data from the cache memory line n+1 406 and the cache memory line n 404 to form the output 460. The output 460 is formed by combining the last 48 bytes of the data in the cache memory line n 404, i.e., data A4 to A15, with the first 16 bytes of the data in the cache memory line n+1 406, i.e., Z1 to Z3.

After the merge logic 330 receives the stored data of the cache memory line n+1 406, the cache memory line split access logic 235 replaces the stored data of the cache memory line n 404 in the stored data array 320 with the data in the cache memory line n+1 406 in one embodiment of the invention. This facilitates contiguous cache memory line split accesses to achieve full throughput operation within a single machine or clock cycle. The cache memory line split access logic 235 shortens the critical path in a microcode program to handle misaligned cache memory accesses and reduces the footprint or size of the microcode in one embodiment of the invention.

The operations 400 and 450 of the cache memory line split access logic 235 illustrated in FIGS. 4A and 4B are not meant to be limiting. One of ordinary skill in the relevant art will readily appreciate that the cache memory line split access logic 235 can handle other types of misaligned cache memory access without affecting the workings of the invention. For example, in one embodiment of the invention, the cache memory line split access logic 235 can be modified or extended to handle cache memory lines that are arranged or accessed in a decreasing or negative order, i.e., negatively strided cache memory arrays. One of ordinary skill in the relevant art will readily appreciate how to modify the cache memory line split access logic 235 to handle negatively strided arrays and the modifications shall not be described herein.

FIG. 5 illustrates a format 500 of an instruction 510 in accordance with one embodiment of the invention. In one embodiment of the invention, the operations 400 and 450 of the cache memory line split access logic 235 illustrated in FIGS. 4A and 4B receive an instruction 510 that indicates a load operation to access arrays that are contiguous in the virtual address space but are misaligned with the boundary of a cache memory line and/or a page memory.

The instruction 510 indicates to the cache memory line split access logic 235 that it is required to handle misaligned cache memory accesses by merging the current data read from a particular cache memory line with the stored data of the prior or preceding cache memory line of the particular cache memory line. In one embodiment of the invention, the instruction 510 has three input arguments. The first input argument of the instruction 510 is a SOURCE address that indicates a physical or virtual address of the L1 data cache memory 250. The SOURCE address indicates to the cache memory line split access logic 235 where to start reading or assessing the L1 data cache memory 250.

The second input argument of the instruction 510 is a DESTINATION address that indicates a physical or virtual address of a memory location to store the read or accessed data from the L1 data cache memory 250. In one embodiment of the invention, the execution unit 230 receives the output from the cache memory line split access logic 235 without storing the output. In another embodiment of the invention, the execution unit 230 receives the output from the cache memory line split access logic 235 and stores the output in a memory location. The memory location includes, but is not limited to, one or more registers, a buffer and the like.

The third input argument of the instruction 510 is an optional INDEX that indicates which of the stored data arrays in the cache memory line split access logic 235 is to be assessed. For example, in one embodiment of the invention, the cache memory line split access logic 235 has a respective stored data array for each processing stream in the processing unit 210. If there are two processing streams in the processing unit 210, the INDEX is set to an appropriate number that is associated with the desired stored data array to be accessed. By using the INDEX, the stored data arrays do not need a respective tag array to identify which processing stream is associated with the stored data arrays in one embodiment of the invention.

In another embodiment of the invention, the cache memory line split access logic 235 has a single stored data array with multiple cache memory lines to store data for each cache memory associated with a processing stream. For example, in one embodiment of the invention, the processing unit 210 is processing three distinct streams and the cache memory line split access logic 235 has a single stored data array with three cache memory lines associated respectively with one of the three streams being concurrently accessed. The INDEX indicates which of the three cache memory lines is to be used when performing a misaligned cache memory access in one embodiment of the invention.

The format of the instruction 510 is not meant to be limiting and one of ordinary skill in the relevant art will readily appreciate that other methods or means to indicate the contiguous misaligned cache memory access can be used without affecting the workings of the invention. In one embodiment of the invention, the existing load instructions can be modified to indicate or hint that contiguous misaligned cache memory access is required. In one embodiment of the invention, the first read or access operation of the instruction 510 is split into two consecutive accesses. Both accesses use the same register or buffer in one embodiment of the invention. The two consecutive accesses initialize the stored data array 320 in the cache memory line split access logic 235.

Figure 6:
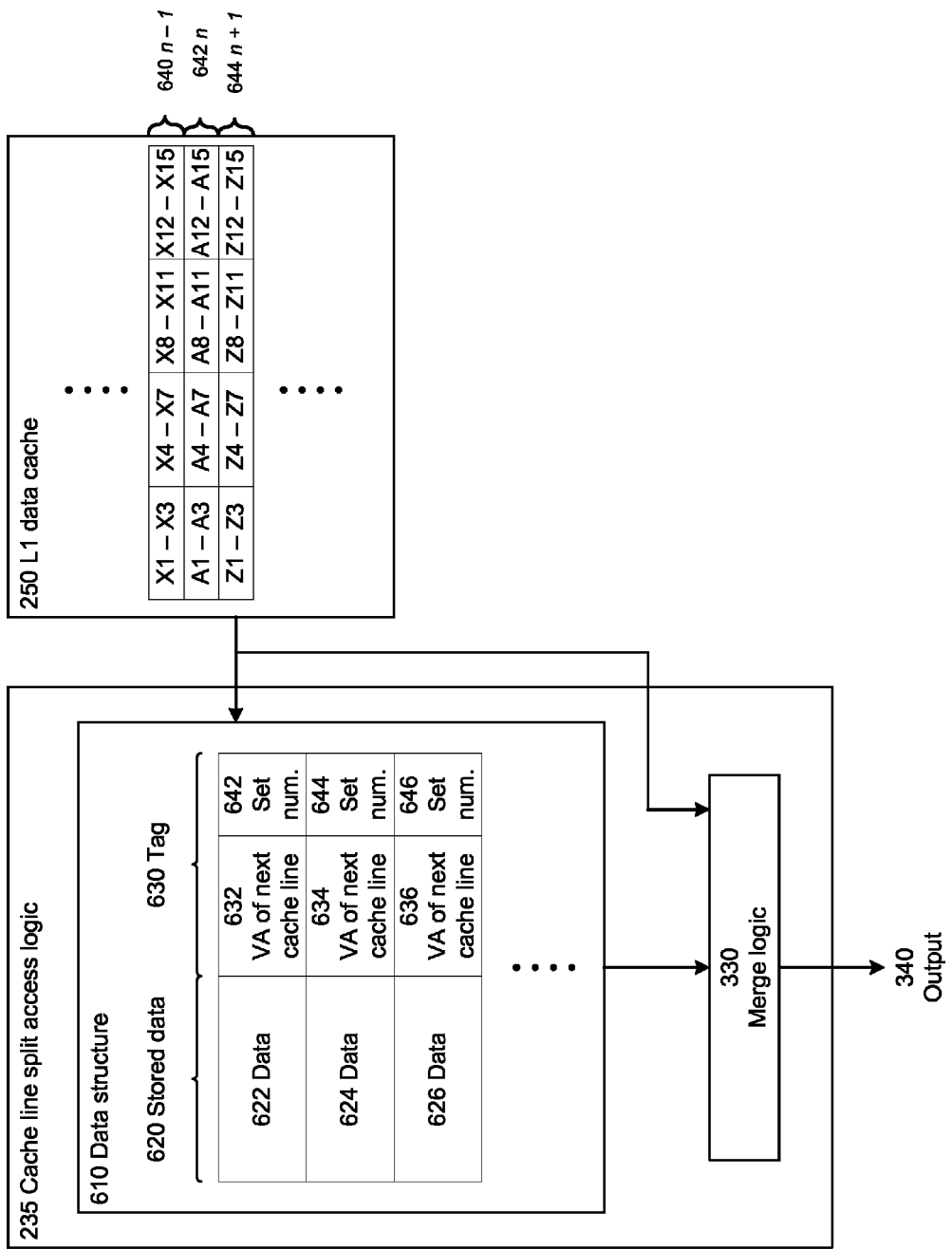
FIG. 6 illustrates the operation of the cache memory line split access logic in accordance with one embodiment of the invention.

FIG. 6 illustrates the operation 600 of the cache memory line split access logic 235 in accordance with one embodiment of the invention. In one embodiment of the invention, the cache memory line split access logic 235 has a data structure 610 that has a stored data array 620 and a tag array 630. The stored data array 620 stores the data of one or more cache memory lines of the L1 data cache memory 250. The data 622, 624, and 626 of the stored data array 620 illustrates the stored data of three cache memory lines of the L1 data cache memory 250. Each of the data 622, 624, and 626 of the stored data array 620 has a respective virtual address (VA) 632, 634, and 636 that is stored in the tag array 630.

For example, in one embodiment of the invention, when the cache memory line split access logic 235 stores the data of the cache memory line n−1 640 as the data 622 in the stored data array 620, the cache memory line split access logic 235 stores the VA of the cache memory line n 642 as the VA 632 in the tag array 630. Similarly, when the cache memory line split access logic 235 stores the data of the cache memory line n 642 as the data 624 in the stored data array 620, the cache memory line split access logic 235 stores the VA of the cache memory line n+1 644 as the VA 634 in the tag array 630.

In one embodiment of the invention, the L1 data cache memory 250 is a N-way set-associative cache memory. In addition to storing the VA 632, 634, and 636, the tag array 630 optionally stores a set number 642, 644, and 646 associated with each of the VA 632, 634, and 636 respectively in one embodiment of the invention. For example, in one embodiment of the invention, the L1 data cache memory 250 is a 8-way set-associative cache memory with 64 sets. The set number 642, 644, and 646 is obtained from the VA 632, 634, and 636 in one embodiment of the invention. In one embodiment of the invention, the six address bits [11:6] of a VA is used as a set address.

When the cache memory line split access logic 235 receives an instruction with a misaligned cache memory line split access of the cache memory lines n−1 640 and n 642, the merge logic 330 compares all the VA in the tag array 630 with the VA of the cache memory line n 642 in one embodiment of the invention. If a match is found in the tag array 630, it indicates that the data stored in the stored data array 620 associated with the matching VA in the tag array 630 is storing the data of the cache memory line n−1 640. The merge logic 330 combines the data read from the cache memory line n 642 and the data of the cache memory line n−1 640 stored in the stored data array 630.

In another embodiment of the invention, when the cache memory line split access logic 235 receives an instruction with a misaligned cache memory line split access of the cache memory lines n−1 640 and n 642, the merge logic 330 compares all the set numbers in the tag array 630 with the set number of the VA of the cache memory line n 642 in one embodiment of the invention. If one or more matches are found in the set number, the corresponding VA of each of the matching set numbers are compared with the VA of the cache memory line n 642. If a match is found in the tag array 630, it indicates that the data stored in the stored data array 620 associated with the matching VA in the tag array 630 is storing the data of the cache memory line n−1 640. The merge logic 330 combines the data read from the cache memory line n 642 and the data of the cache memory line n−1 640 stored in the stored data array 630. By comparing the set numbers first before comparing the VA, the cache memory cache memory line split access logic 235 saves execution time when no match is found. This is because the set numbers have a smaller number of bits than the bits in the VA and the execution time to compare the bits is smaller.

Figure 7:
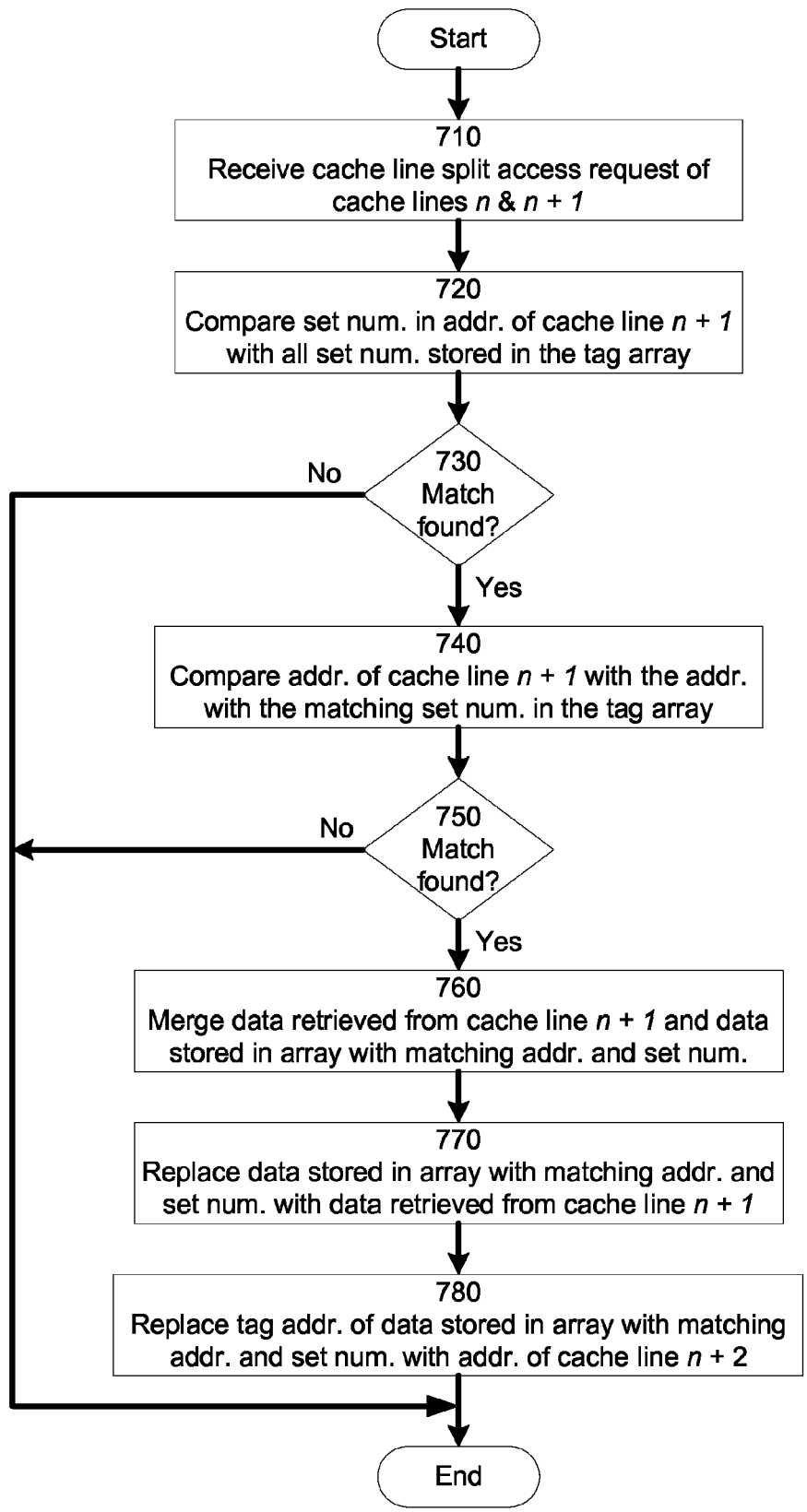
FIG. 7 illustrates a flow chart to handle an misaligned cache memory access in accordance with one embodiment of the invention.

FIG. 7 illustrates a flow chart 700 to handle a non-aligned cache memory access in accordance with one embodiment of the invention. For clarity of illustration, FIG. 7 is discussed with reference to FIG. 6. In step 710, the cache memory cache memory line split access logic 235 receives a cache memory line split access request of cache memory lines n and n+1. In step 720, the cache memory cache memory line split access logic 235 compares the set number of the VA of the cache memory line n+1 with the set numbers stored in the tag array 630.

If no match is found in step 730, the flow ends. If one or more matches are found in step 730, the flow 700 goes to step 740 compares the VA of each matching set number in the tag array 630 with the VA of the cache memory line n+1. If no match is found in step 750, the flow ends. If a match is found in step 750, the cache memory cache memory line split access logic 235 merges the data retrieved or read for the cache memory line n+1 with the stored data in the stored data array 620 that has the matching set number and VA in step 760.

In step 770, the cache memory cache memory line split access logic 235 replaces the stored data in the stored data array 620 that has the matching set number and VA with the data retrieved or read for the cache memory line n+1. In step 780, the cache memory cache memory line split access logic 235 replaces the VA of the stored data that has the matching set number and VA with the VA of the cache memory line n+2, i.e., the immediate sequential cache memory line of the cache memory line n+1, and the flow 700 ends.

The steps 720 and 730 are optional in one embodiment of the invention. In one embodiment of the invention, the stored data array 620 and the tag array 630 is flushed when a TLB invalidation event has occurred to maintain cache coherency.

Figure 8:
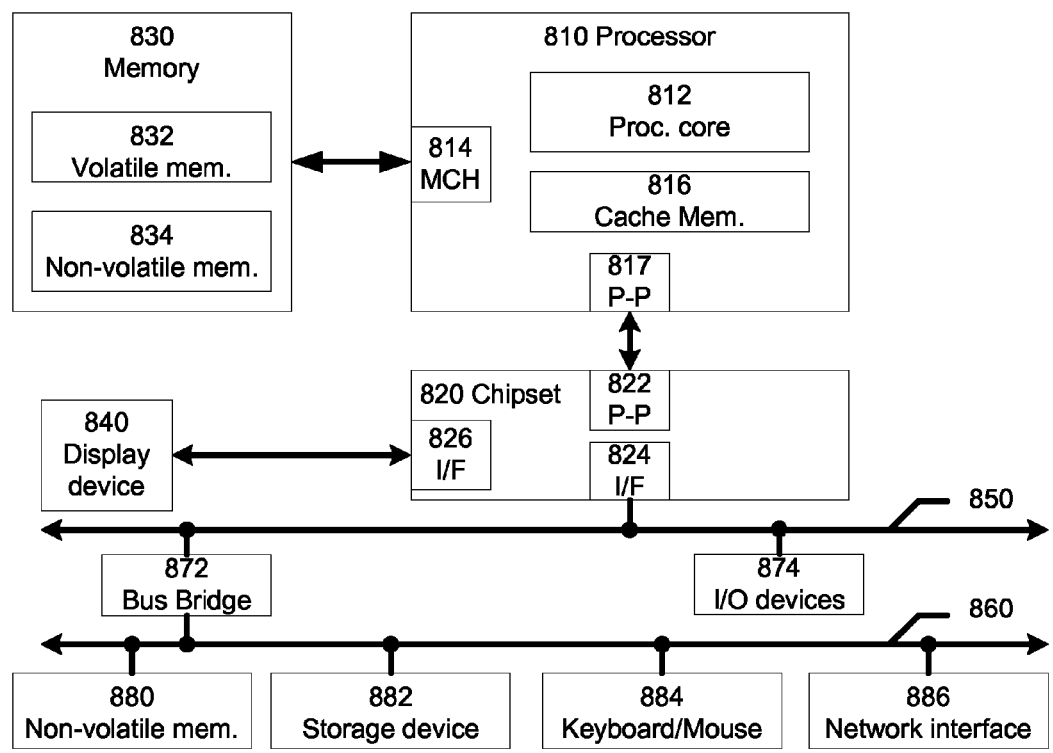
FIG. 8 illustrates a system to implement the methods disclosed herein in accordance with one embodiment of the invention.

FIG. 8 illustrates a system 800 to implement the methods disclosed herein in accordance with one embodiment of the invention. The system 800 includes, but is not limited to, a desktop computer, a laptop computer, a netbook, a notebook computer, a personal digital assistant (PDA), a server, a workstation, a cellular telephone, a mobile computing device, an Internet appliance or any other type of computing device. In another embodiment, the system 800 used to implement the methods disclosed herein may be a system on a chip (SOC) system.

The processor 810 has a processing core 812 to execute instructions of the system 800. The processing core 812 includes, but is not limited to, pre-fetch logic to fetch instructions, decode logic to decode the instructions, execution logic to execute instructions and the like. The processor 810 has a cache memory 816 to cache instructions and/or data of the system 800. In another embodiment of the invention, the cache memory 816 includes, but is not limited to, level one, level two and level three, cache memory or any other configuration of the cache memory within the processor 810.

The memory control hub (MCH) 814 performs functions that enable the processor 810 to access and communicate with a memory 830 that includes a volatile memory 832 and/or a non-volatile memory 834. The volatile memory 832 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 834 includes, but is not limited to, NAND flash memory, phase change memory (PCM), read only memory (ROM), electrically erasable programmable read only memory (EEPROM), or any other type of non-volatile memory device.

The memory 830 stores information and instructions to be executed by the processor 810. The memory 830 may also stores temporary variables or other intermediate information while the processor 810 is executing instructions. The chipset 820 connects with the processor 810 via Point-to-Point (PtP) interfaces 817 and 822. The chipset 820 enables the processor 810 to connect to other modules in the system 800. In one embodiment of the invention, the interfaces 817 and 822 operate in accordance with a PtP communication protocol such as the Intel® QuickPath Interconnect (QPI) or the like. The chipset 820 connects to a display device 840 that includes, but is not limited to, liquid crystal display (LCD), cathode ray tube (CRT) display, or any other form of visual display device.

In addition, the chipset 820 connects to one or more buses 850 and 855 that interconnect the various modules 874, 860, 862, 864, and 866. Buses 850 and 855 may be interconnected together via a bus bridge 872 if there is a mismatch in bus speed or communication protocol. The chipset 820 couples with, but is not limited to, a non-volatile memory 860, a mass storage device(s) 862, a keyboard/mouse 864 and a network interface 866. The mass storage device 862 includes, but is not limited to, a solid state drive, a hard disk drive, an universal serial bus flash memory drive, or any other form of computer data storage medium. The network interface 866 is implemented using any type of well known network interface standard including, but not limited to, an Ethernet interface, a universal serial bus (USB) interface, a Peripheral Component Interconnect (PCI) Express interface, a wireless interface and/or any other suitable type of interface. The wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 8 are depicted as separate blocks within the system 800, the functions performed by some of these blocks may be integrated within a single semiconductor circuit or may be implemented using two or more separate integrated circuits. For example, although the cache memory 816 is depicted as a separate block within the processor 810, the cache memory 816 can be incorporated into the processor core 812 respectively. The system 800 may include more than one processor/processing core in another embodiment of the invention.

The methods disclosed herein can be implemented in hardware, software, firmware, or any other combination thereof. Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. An apparatus comprising:
    a cache memory having a plurality of cache memory lines;
    an array to store one or more of the plurality of cache memory lines; and
    logic coupled with the cache memory and the array to:
        obtain contents of a first cache memory line of the plurality of cache memory lines;
        merge at least in part, the obtained contents of the first cache memory line with contents of one of the one or more cache memory lines stored in the array;
        replace the contents of the one cache memory line stored in the array with the obtained contents of the first cache memory line in response to merging at least in part, the obtained contents of the first cache memory line with the contents of the one cache memory line stored in the array;
        receive a request to access the contents of the first cache memory line and a second cache memory line, wherein the second cache memory line is stored in the array as the one cache memory line; and
    a plurality of processing streams, wherein the request comprises a load instruction having an indication of which one of the plurality of processor streams is associated with the array.

2. The apparatus of claim 1, wherein the array is further to store an address for each of the one or more stored cache memory lines in the array, and wherein the logic to merge at least in part, the obtained contents of the first cache memory line with contents of the second cache memory line stored in the array is to:
    determine whether the address of the first cache memory line matches an stored address of the one cache memory line stored in the array; and
    merge at least in part, the obtained contents of the first cache memory line with contents of the second cache memory line stored in the array in response to a determination that the address of the first cache memory line matches the stored address of the one cache memory line stored in the array.

3. The apparatus of claim 2, wherein the array is further to store a set number for each of the one or more stored cache memory lines in the array, and wherein the logic to determine whether the address of the first cache memory line matches the stored address of the one cache memory line stored in the array is to:
    determine whether a set number of the first cache memory line matches an stored set number of the one cache memory line stored in the array; and
    determine whether the address of the first cache memory line matches the stored address of the one cache memory line stored in the array in response to a determination that the set number of the first cache memory line matches the stored set number of the one cache memory line stored in the array.

4. The apparatus of claim 3, wherein the logic is further to:
    replace the stored address of the one cache memory line stored in the array with an address of an immediate succeeding cache memory line of the first cache memory line; and
    replace the stored set number of the one cache memory line stored in the array with a set number of the immediate succeeding cache memory line of the first cache memory line.

5. The apparatus of claim 1, wherein an address of the first cache memory line and an address of the second cache memory line are contiguous.

6. A system comprising:
    a processor comprising:
        a cache memory having a plurality of cache memory lines;
        logic coupled with the cache memory to facilitate access of at least two of the plurality of cache memory lines in a single processing cycle of the processor, wherein the at least two cache memory lines are located sequentially in the cache memory, and wherein the logic coupled with the cache memory to facilitate access of the at least two cache memory lines in the single processing cycle of the processor is to:

store data of a first of the at least two cache memory lines in a processing cycle prior to the single processing cycle;

obtain data of a second of the at least two cache memory lines in the single processing cycle;

determine whether an address of the data of the second of the at least two cache memory lines matches an stored address of the stored data of the first of the at least two cache memory lines;

merge at least in part, the stored data of the first of the at least two cache memory lines with the obtained data of the second of the at least two cache memory lines in response to a determination that the address of the data of the second of the at least two cache memory lines matches the stored address of the stored data of the first of the at least two cache memory lines.

7. The system of claim 6, wherein the single processing cycle comprises one of a clock cycle, a machine cycle and an execution cycle.

8. The system of claim 6, wherein the logic coupled with the cache memory to facilitate access of the at least two cache memory lines in the single processing cycle of the processor is further to:

replace the stored data of the first of the at least two cache memory lines with the obtained data of the second of the at least two cache memory lines in response to merging at least in part, the stored data of the first of the at least two cache memory lines with the obtained data of the second of the at least two cache memory lines.

9. The system of claim 6, wherein the logic coupled with the cache memory to facilitate access of the at least two cache memory lines in the single processing cycle of the processor is further to store an address of the data of the first of the at least two cache memory lines.

10. The system of claim 9, wherein the address of the data of the first of the at least two cache memory lines comprises a set number and wherein the logic to merge at least in part, the stored data of the first of the at least two cache memory lines with the obtained data of the second of the at least two cache memory lines is further to:

determine whether a set number of an address of the data of the second of the at least two cache memory lines matches a set number of an address of the data of the first of the at least two cache memory lines; and determine whether the address of the data of the second of the at least two cache memory lines matches the address of the stored data of the first of the at least two cache memory lines in response to a determination that the set number of the address of the data of the second of the at least two cache memory lines matches the set number of the address of the data of the first of the at least two cache memory lines; and merge at least in part, the stored data of the first of the at least two cache memory lines with the obtained data of the second of the at least two cache memory lines in response to a determination that the address of the data of the second of the at least two cache memory lines matches the stored address of the stored data of the first of the at least two cache memory lines.

11. The system of claim 10, wherein the logic to merge at least in part, the stored data of the first of the at least two cache memory lines with the obtained data of the second of the at least two cache memory lines is further to:

replace the stored address of the first of the at least two cache memory lines with an address of an immediate succeeding cache memory line of the second of the at least two cache memory lines; and replace the stored set number of the first of the at least two cache memory lines with a set number of the immediate succeeding cache memory line of the second of the at least two cache memory lines.

12. A method comprising:

storing data of a first of at least two cache memory lines in a first processing cycle;

retrieving data of a second of the at least two cache memory lines in a second processing cycle;

determining whether an address of the data of the second of the at least two cache memory lines matches an stored address of the stored data of the first of the at least two cache memory lines; and merging at least in part, the stored data of the first of the at least two cache memory lines with the retrieved data of the second of the at least two cache memory lines in response to a determination that the address of the data of the second of the at least two cache memory lines matches the stored address of the stored data of the first of the at least two cache memory lines.

13. The method of claim 12, wherein the at least two cache memory lines are located sequentially in a cache memory.

14. The method of claim 12, wherein the first and the second processing cycle comprises one of a clock cycle, a machine cycle and an execution cycle.

15. The method of claim 12, further comprising:

replacing the stored data of the first of the at least two cache memory lines with the obtained data of the second of the at least two cache memory lines in response to merging at least in part, the stored data of the first of the at least two cache memory lines with the obtained data of the second of the at least two cache memory lines.

16. The method of claim 12, further comprising:

storing an address of the data of the first of the at least two cache memory lines.

17. The method of claim 16, wherein the address of the data of the first of the at least two cache memory lines comprises a set number and wherein merging at least in part, the stored data of the first of the at least two cache memory lines with the obtained data of the second of the at least two cache memory lines comprises:

determining whether a set number of an address of the data of the second of the at least two cache memory lines matches a set number of an address of the data of the first of the at least two cache memory lines; and determining whether the address of the data of the second of the at least two cache memory lines matches the address of the stored data of the first of the at least two cache memory lines in response to a determination that the set number of the address of the data of the second of the at least two cache memory lines matches the set number of the address of the data of the first of the at least two cache memory lines; and merging at least in part, the stored data of the first of the at least two cache memory lines with the obtained data of the second of the at least two cache memory lines in response to a determination that the address of the data of the second of the at least two cache memory lines matches the stored address of the stored data of the first of the at least two cache memory lines.

18. The method of claim 12, wherein merging at least in part, the stored data of the first of the at least two cache memory lines with the obtained data of the second of the at least two cache memory lines comprises:

replacing the stored address of the first of the at least two cache memory lines with an address of an immediate succeeding cache memory line of the second of the at least two cache memory lines; and replacing the stored set number of the first of the at least two cache memory lines with a set number of the immediate succeeding cache memory line of the second of the at least two cache memory lines.

* * * * *